United States Patent
Hoshino

(10) Patent No.: US 6,515,729 B1
(45) Date of Patent: Feb. 4, 2003

(54) REFLECTION-TYPE COLOR LIQUID CRYSTAL DISPLAY DEVICE

(75) Inventor: Koichi Hoshino, Omiya (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/361,608

(22) Filed: Jul. 27, 1999

(30) Foreign Application Priority Data

Jul. 29, 1998 (JP) ............................................ 10-213585
Oct. 22, 1998 (JP) ............................................ 10-300602

(51) Int. Cl.⁷ ..................... G02F 1/1345; G02F 1/1333
(52) U.S. Cl. ........................ 349/158; 349/113; 349/151
(58) Field of Search ................................ 349/113, 117, 349/151, 158, 106

(56) References Cited

U.S. PATENT DOCUMENTS

| | | | | |
|---|---|---|---|---|
| 3,973,388 A | * | 8/1976 | Yoshida et al. ................. | 58/50 |
| 5,136,407 A | * | 8/1992 | Clere et al. ..................... | 359/55 |
| 5,229,873 A | * | 7/1993 | Hirose et al. ................... | 359/55 |
| 5,296,954 A | * | 3/1994 | Ichimura et al. ................ | 359/67 |
| 6,008,871 A | * | 12/1999 | Okumura et al. ............... | 349/61 |
| 6,055,103 A | * | 4/2000 | Woodgate et al. .......... | 359/494 |
| 6,184,955 B1 | * | 2/2001 | Okumura et al. ............... | 349/96 |
| 6,266,117 B1 | * | 7/2001 | Yanagawa et al. .......... | 349/141 |
| 6,295,108 B1 | * | 9/2001 | Kaneko ....................... | 349/115 |

FOREIGN PATENT DOCUMENTS

| | | |
|---|---|---|
| JP | 59-198489 | 11/1984 |
| JP | 3-223715 | 10/1991 |
| JP | 5-241143 | 9/1993 |
| JP | 10-3078 | 1/1998 |

* cited by examiner

*Primary Examiner*—Kenneth Parker
(74) *Attorney, Agent, or Firm*—Armstrong, Westerman & Hattori, LLP

(57) ABSTRACT

A liquid crystal cell (10) is structured by bonding a first thin substrate (1) having first electrodes (5) and a second thick substrate (2) having second electrodes (6) together with an anisotropic conductive sealant (23), sandwiching a liquid crystal layer (7) therebetween, and providing a color filter (3) on the thicker substrate (2). A retardation film (11) and a polarizing film (12) are provided outside the second substrate (2) in order, and a diffusing layer (13), a reflection-type polarizing film (14) and a light absorbing layer (15) are provided outside the first substrate (1) in order. A liquid crystal driving IC (21) is mounted on the thicker second substrate (2). Each first electrode (5) on the first substrate (1) and each wiring pattern (26) connected to the liquid crystal driving IC (21) on the second substrate (2) are individually and electrically connected through the anisotropic conductive sealant (23).

10 Claims, 3 Drawing Sheets

REFLECTION-TYPE COLOR LIQUID CRYSTAL DISPLAY DEVICE

BACKGROUND OF THE INVENTION

1. Field of the Invention

The present invention relates to a structure of a reflection-type liquid crystal display device, more specifically, to a reflection-type color liquid crystal display device containing a color filter therein, capable of displaying in multiple colors.

2. Description of the Related Art

As a conventional reflection-type liquid crystal display device, a reflection-type liquid crystal display device of a monochrome display using a TN (twisted nematic) liquid crystal cell or an STN (super twisted nematic) liquid crystal cell, is mainly used.

For the growing demand of displaying in colors in recent years, reflection-type color liquid crystal display devices containing color filters therein have been vigorously developed.

The reflection-type color liquid crystal display devices containing color filters therein are broadly classified into the following three types.

The first example is a reflection-type color liquid crystal display device using no polarizing films. There are several types belonging to this example: one type using guest-host liquid crystal in which a black dye is mixed in a liquid crystal material filled in a liquid crystal cell; another type using polymer-dispersion liquid crystal in which a liquid crystal material is dispersed in a high polymer; and so on. Since any one of them does not use a polarizing film, it is excellent in brightness but low in contrast, thus it has not been realized for practical use yet.

The reflection-type color liquid crystal display device using the guest-host liquid crystal is disclosed in, for example, Japan Patent Laid-open No. Sho 59-198489. The reflection-type color liquid crystal display device using the polymer dispersion liquid crystal is disclosed in, for example, Japan Patent Laid-open No. Hei 5-241143.

The second example is a reflection-type color liquid crystal display device using one polarizing film and containing a reflector inside a liquid crystal cell. Moreover, this example has two types. These are one type using an intra-cellular reflector having a mirror surface and a diffusing layer provided on the surface of the liquid crystal cell, and the one using a reflector with scattering properties in the reflecting surface thereof.

Since either type uses only one polarizing film, it is also excellent in brightness but low in contrast.

In the type using an intra-cellular reflector having a mirror surface, though it is bright in a direction of regular reflection of incident light, it becomes abruptly darker at other angles, that is, the viewing angle characteristic thereof is quite poor. In the type using a reflector with scattering properties in the reflecting surface thereof, it is difficult to control scattering properties, thus the manufacturing process becomes complicated.

This reflection-type color liquid crystal display device using one polarizing film is disclosed in, for example, Japan Patent Laid-open No. Hei 3-223715.

The third example is a reflection-type color liquid crystal display device using two polarizing films and having a color filter provided in a liquid crystal cell of a typical monochrome liquid crystal display device. Since this example uses two polarizing films, it is excellent in contrast, but it has a disadvantage of a dark display. However, a reflection-type polarizing film is used for a lower polarizing film, thereby improving brightness, and this reflection-type color liquid crystal display device is considered for practical use.

The reflection-type color liquid crystal display device using a reflection-type polarizing film is disclosed in, for example, Japan Patent Laid-open No. Hei 10-3078.

Hereinafter, the conventional reflection-type color liquid crystal display device using the above reflection-type polarizing film will be briefly explained using FIG. 6.

FIG. 6 shows only a liquid crystal cell 20 of the above reflection-type color liquid crystal display device. The liquid crystal cell 20 includes a first substrate 1 which is a transparent glass substrate and has first electrodes 5, a second substrate 2 which is a transparent glass substrate and has second electrodes 6, and a liquid crystal layer 7 sandwiched therebetween.

A color filter 3 in which three color filters of red (R), green (G) and blue (B) are arranged in alternate order and a protective film 4 are formed on the inner surface side of the second substrate 2, and the second electrodes 6 are formed on the protective film 4.

Both of the first electrodes 5 and the second electrodes 6 are transparent electrodes made of indium tin oxide (ITO). A large number of them are arranged side by side in directions orthogonal to each other to form display pixels at respective intersections thereof. Each color filter of the color filter 3 is arranged on each display pixel in such order of R, G, and B in the both directions orthogonal to each other.

A typical polarizing film (an absorption-type polarizing film) is provided on the visible side (the upper side in FIG. 6) of the liquid crystal cell 20, and a reflection-type polarizing film is provided on the other side (the lower side in FIG. 6), but the illustration thereof is omitted.

Against the liquid crystal cell 20 structured as above, incident light 32 is incident from the upper side of the visible side and then passes through the second substrate 2, the color filter 3, the protective film 4, the second electrodes 6, the liquid crystal layer 7, the first electrodes 5 and the first substrate 1 in order. Thereafter, the light is selectively reflected by the reflection-type polarizing film (not shown) arranged under the first substrate 1 according to the linearly polarized light direction (varying according to the existence of the voltage application between the first and second electrodes 5, 6) of the passed light. However, in this explanation, the passed light is assumed to be reflected by a reflecting surface 31a provided on the lower surface of the first substrate 1 for convenience.

Reflected light 33a of the passed light returns in the reverse order to be emitted toward the visible side (the upper side), and finally reaches the observer's eye. At this time, the incident light 32 and the reflected light 33a pass through the color filter 3, thereby displaying in color.

However, if the first substrate 1 disposed at the lower side is thick, as shown FIG. 6, the light 33a reflected by the reflecting surface 31a passes through a different color filter of other pixel from that the incident light 32 passes. Accordingly, in this case, a color image is displayed only in poor chroma because of occurrence of mixture of colors.

When the first substrate 1 at the lower side is made thin, the reflecting surface 31a takes a position, for example, shown by a virtual line in FIG. 6. In this case, the incident light 32 and reflected light 33b pass through the same color (blue in the example of the illustration) filter of the same pixel. Consequently, an excellent color image can be displayed without reduction in chroma.

As the pitch of the display pixel becomes smaller or the incident light tilts more, a phenomenon of reduction in chroma becomes increasingly apparent. For this reason, the reflecting surface 31a is required to be disposed closer to the liquid crystal layer 7.

The distance between the reflecting surface 31a and the liquid crystal layer 7 is almost determined by the thickness of the first substrate 1. Accordingly, in order to make the reflecting surface 31a as close as possible to the liquid crystal layer 7, a substrate as thin as possible is preferably used. Thereby, the influence by adjacent pixels decreases, and it becomes possible to display a clear image.

In other words, in order to display an image excellent in chroma at wider viewing angle, it is better that the thickness of the first substrate 1 is made as thin as possible.

However, when a liquid crystal cell is actually manufactured using a thin substrate, the strength of the substrate decreases as the thickness thereof becomes thinner. Accordingly, the frequency of occurrence of defects due to damage of the substrate or the like increases, it becomes difficult to securely manufacture a durable liquid crystal cell.

Moreover, when securely providing a high-definition liquid crystal display device, a method in which a semiconductor integrated circuit device (hereinafter referred to as "a driving IC") containing a liquid crystal driving circuit therein is directly bonded on a substrate and an image display is performed using the driving IC, the so-called chip-on-glass method, is used. When the chip-on-glass is employed, it is difficult to securely bond the diving IC unless the substrate has certain strength.

SUMMARY OF THE INVENTION

An object of the present invention is to solve the above problems and to securely provide a reflection-type color liquid crystal display device capable of performing a color image display bright and excellent in chroma.

To achieve the above object, the present invention provides a reflection-type color liquid crystal display device structured as follows.

A liquid crystal cell is structured by sandwiching a liquid crystal layer made of nematic liquid crystal which is aligned at a twist angle of 180° to 270° between a first transparent substrate having first electrodes and a second transparent substrate having second electrodes, and providing a color filter of a plurality of colors on at least one substrate of said first and second substrates.

Moreover, a retardation film and a polarizing film are provided outside the second substrate of the liquid crystal cell in order, and a diffusing layer, a reflection-type polarizing film and a light absorbing layer are provided outside the first substrate in order.

Furthermore, the first substrate and the second substrate of the liquid crystal cell are bonded together with an anisotropic conductive sealant that is anisotropic in electrical conduction direction. The first substrate is made thinner in thickness than the second substrate, and a liquid crystal driving integrated circuit (a driving IC) is mounted on the thicker second substrate.

The first electrodes on the first substrate and wiring patterns formed on the second substrate and connected to the liquid crystal driving integrated circuit are individually and electrically connected through the anisotropic conductive sealant.

Through the structure as described above, the first substrate can be made thin while the strength of the liquid crystal cell is kept by the thickness of the second substrate, and the second substrate has a sufficient thickness and strength for manufacturing, thus the liquid crystal cell can be securely manufactured.

In addition, since the liquid crystal driving IC is also mounted on the second substrate having a sufficient thickness and strength, it can be directly bonded to the substrate to be mounted, and it can easily connect to the first electrodes on the first substrate through the anisotropic conductive sealant.

Incidentally, if the color filter is provided on the second substrate having a sufficient thickness, strength and accuracy, even a high definition color filter can be securely manufactured with high accuracy.

Moreover, the first electrodes are made thinner or higher in optical transmittance than the second electrodes, thereby a brighter display can be performed.

The above and other objects, features and advantages of the invention will be apparent from the following detailed description which is to be read in conjunction with the accompanying drawings.

DETAILED DESCRIPTION OF THE PREFERRED EMBODIMENTS

The preferred embodiment of the reflection-type liquid crystal display device according to the present invention will be described hereinafter using the accompanying drawings.

Figure 1:
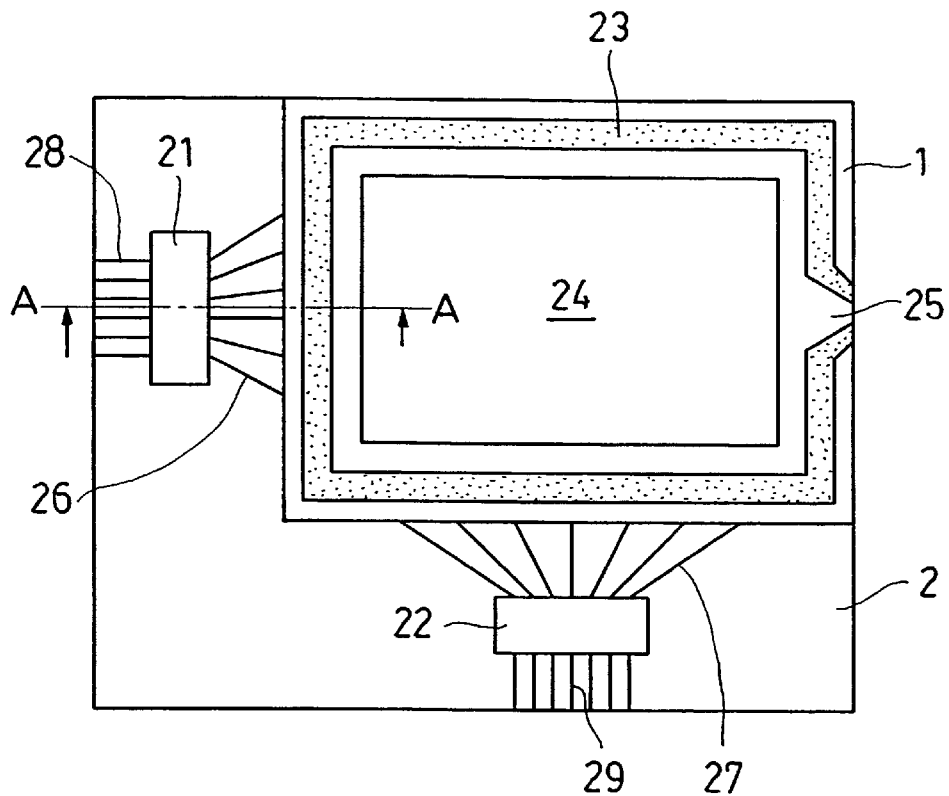
FIG. 1 is a diagrammatic plane view from the other side (a rear side) of the visible side of an embodiment of a reflection-type color liquid crystal display device according to the present invention.
Figure 2:
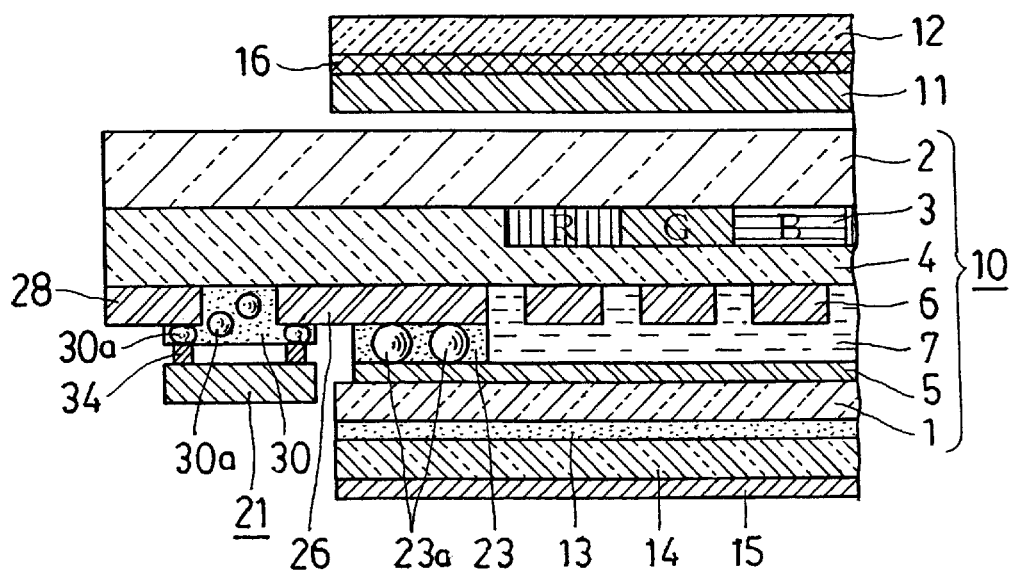
FIG. 2 is a fragmentary enlarged sectional view taken along the A—A line in FIG. 1.

FIG. 1 is a diagrammatic plane view from the other side (a rear side) of the visible side of an embodiment of a reflection-type color liquid crystal display device according to the present invention, in which polarizing films and the like arranged sandwiching the liquid crystal cell are omitted in the illustration. FIG. 2 is a fragmentary enlarged sectional view taken along the A—A line in FIG. 1, in which the polarizing films and the like arranged sandwiching the liquid crystal cell are all illustrated.

Figure 6:
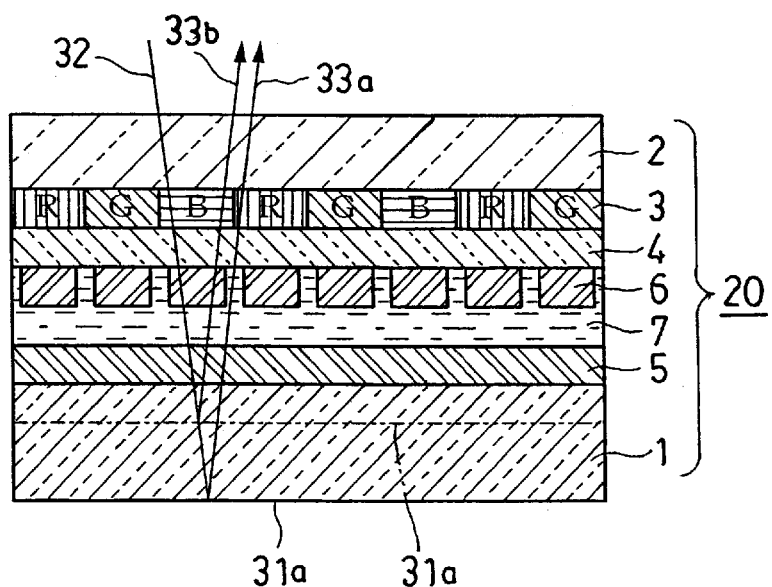
FIG. 6 is a schematic sectional view of only a liquid crystal cell of a conventional reflection-type color liquid crystal display device for explaining disadvantages thereof.

In FIG. 1 and FIG. 2, the same numerals of respective portions constituting the liquid crystal cell 20 of the conventional example shown in FIG. 6 are attached to those of a liquid crystal cell 10 for convenience of explanation, though there exists a difference in thickness or the like wherebetween The liquid crystal cell 10 of the reflection-type color liquid crystal display device shown in FIG. 1 and FIG. 2 is structured such that a first substrate 1 made of a glass plate with a thickness of 0.4 mm and a second substrate 2 made of a glass plate with a thickness of 0.7 mm are bonded to each other using an anisotropic conductive sealant 23, and then a liquid crystal layer 7 made of nematic liquid crystal which is aligned at a twist angle of 225° is sandwiched between the two substrates 1 and 2.

On the inner surface of the first substrate 1 of the liquid crystal cell 10, first transparent electrodes 5 made of ITO (indium tin oxide) are formed. On the other hand, on the inner surface of the second substrate 2, a color filter 3 consisting of three color filters of red (R), green (G) and blue (B) with a thickness of 0.4 $\mu$m provided by the pigment dispersion method, a protective film 4 with a thickness of 2 $\mu$m made of an acrylic material, and second transparent electrodes 6 made of ITO, are formed.

Then, the second substrate 2 thick in thickness is made larger than the first substrate 1 in such a manner to extend in two directions orthogonal to each other. On the extended portion, a row side driving IC 21 and a column side driving IC 22 for applying voltage on the liquid crystal layer 7 in the liquid crystal cell 10 via the first and second electrodes 5, 6 to perform an image display are directly attached to be mounted.

On the lower surface of the second substrate 2, formed are row side wiring patterns 26 for individually connecting the row side driving IC 21 and each first electrode 5 via the anisotropic conductive sealant 23, and row side input patterns 28 which are input terminals of the row side driving IC 21.

Moreover, column side wiring patterns 27 for individually connecting the column side driving IC 22 and each second electrode 6, and column side input patterns 29 which are input terminals of the column side driving IC 22, are formed.

On the outside of the second substrate 2 (the visible side) of the liquid crystal cell 10, a retardation film 11 with a retardation value R=0.55 $\mu$m is first disposed, and further outside that, a polarizing film 12 with a transmittance of 46% is disposed. The polarizing film 12 is a typical absorption-type polarizing film which absorbs the linearly polarized light in a direction orthogonal to the transmission axis thereof.

On the other hand, a diffusing layer 13 is first disposed on the outside of the first substrate 1 (the other side of the visible side), a reflection-type polarizing film 14 is disposed outside that, and a light absorbing layer 15 is arranged further outside that. The reflection-type polarizing film 14 is a polarizing film which reflects the linearly polarized light in a direction orthogonal to the transmission axis thereof.

In the liquid crystal 10 of the reflection-type color liquid crystal display device, as descried above, the first substrate 1 is made of a glass plate with a thickness of 0.4 mm, which is 0.3 mm thinner than the second substrate 2 made of a glass plate with a thickness of 0.7 mm.

Moreover, since the diffusing layer 13 is a thin diffusing adhesive layer as described later, the reflection-type polarizing film 14 and the first substrate 1 closely contact each other. Therefore, the reflecting surface of the reflection-type polarizing film 14 and the liquid crystal layer 7 adjoin closely to each other by making the first substrate 1 thin. Accordingly, as described above, the incident light and the reflected light thereof pass through the same pixel (the same color filter) at a high rate, which enables an excellent color image display with less drop in chroma.

Meanwhile, on the second substrate 2, it is necessary that the color filter 3 is formed, and that the row side driving IC 21 and the column side driving IC 22 for driving the liquid crystal cell 10 by applying voltage on the liquid crystal layer 7 are mounted on the portion extending outward the liquid crystal cell 10.

Accordingly, the substrate 2 needs to have sufficient strength for withstanding the above manufacturing processes. Therefore a glass plate with a thickness of 0.7 mm is used for the second substrate 2 so as to manufacture the liquid crystal cell 10 securely.

Next, the first and second electrodes 5, 6 provided on the inner surfaces opposing to each other of the first substrate 1 and the second substrate 2, will be explained.

In an image display region 24 shown in FIG. 1, the first electrodes 5 are patterned into a strip-shape long in the lateral direction and a large number of first electrodes 5 are arranged in the longitudinal direction. The second electrodes 6 are patterned in a strip-shape long in the longitudinal direction and a large number of second electrodes 6 are arranged in the lateral direction. Thereby a pixel is formed at each portion where the first electrode 5 and the second electrode 6 overlap each other. In other words, a large number of pixels are arranged within the image display region 24 in rows and columns (in a matrix).

Moreover, on the surface of the second substrate 2 on which the second electrodes 6 are formed, the row side wiring patterns 26 for connecting a signal output terminal of the row side driving IC 21 and each strip-shaped first electrode 5 provided within the image display region, the column side wiring patterns 27 for connecting a signal output terminal of the column side driving IC 22 and each strip-shaped second electrode 6, and the row side input patterns 28 and the column side input patterns 29 for supplying signals from the outside to the row side driving IC 21 and the column side driving IC 22 respectively, are formed with the same material (ITO) as the second electrodes 6.

In order to bond the first substrate 1 and the second substrate 2 together, used is the anisotropic conductive sealant 23 in which conductive particles 23a with a diameter of 6 $\mu$m are mixed in an epoxy sealant. The use of the anisotropic conductive sealant 23 can give insulating properties in a plane direction and conductive properties in a sectional direction (a vertical direction in FIG. 2).

Furthermore, the row side wiring patterns 26 on the second substrate 2 and the first electrodes 5 on the first substrate 1 are formed in such a manner to overlap each other at portions where the anisotropic conductive sealant 23 is provided.

By bonding the first substrate 1 and the second substrate 2 together in such a manner that the overlapping portions thereof are aligned each other, it is possible to electrically connect each row side wiring pattern 26 on the second substrate 2 and each first electrode 5 on the first substrate 1 individually via the conductive particles 23a in the anisotropic conductive sealant 23, and to keep insulation between adjacent electrodes and wiring patterns.

Consequently, voltage generated in the row side driving IC 21 is transmitted from each row side wiring pattern 26 via the anisotropic conductive sealant 23 to each first electrode 5 in the image display region 24.

A liquid crystal inlet 25 for injecting liquid crystal is provided in the anisotropic conductive sealant 23, and it is closed with a sealant (not shown) after the injection of the liquid crystal so as to prevent the liquid crystal from leaking out. The anisotropic conductive sealant 23 also serves as spacers for keeping a fixed spacing between the first substrate 1 and the second substrate 2 with a large number of conductive particles 23a mixed therein.

As shown in FIG. 2, the row side driving IC 21 is provided with a plurality of input/output terminals 34 in protruding shapes for individually inputting and outputting voltage signals, and is bonded to the second substrate 2 with an anisotropic conductive film 30 in such a manner that the input/output terminals 34 are aligned to the row side wiring patterns 26 and the row side input patterns 28 which are formed on the second substrate 2 with the same material as the second electrodes 6.

As for the column side driving IC 22, though the bonded portion thereof is not illustrated, it is the same as in the case of the row side driving IC 21.

As the anisotropic conductive film 30, in which minute conductive particles 30a are mixed in a thermosetting adhesive tape, the trade name of CP-84301Q manufactured by Sony Chemicals is used in this embodiment.

In order to bond the row side driving IC 21 and the column side driving IC 22 to the second substrate 2 respectively using the anisotropic conductive film 30, it is necessary to press the row side driving IC 21 and the column side driving IC 22 against the second substrate 2 with high pressure while applying high temperature. Therefore, thin glass with low strength is too low in workability and fragile for use.

For this reason, it is designed in this embodiment that no driving IC is bonded on the first substrate 1 which is thin glass with low strength, and all the driving ICs are bonded on the second substrate 2 made of thick glass with high strength. Consequently, the occurrence of defects due to breakage of glass and the like are avoided, thereby secure manufacturing of a reflection-type color liquid crystal display device capable of performing an excellent color image display is possible.

In order to perform a display as bright as possible, an ITO film with a sheet resistance value of 80Ω to 100Ω as the first electrodes 5 is formed on the first substrate 1. The optical transmittance of the ITO film is about 90%. On the other hand, it is better if an ITO film of the second electrodes 6 formed on the second substrate 2 is also thin. However, unless the wiring resistances of the row side wiring pattern 26 and the column side wiring pattern 27 are sufficiently low, there occurs a cross talk and the like, which makes it difficult to perform an excellent image display. For this reason, an ITO film with a sheet resistance of 15Ω to 30Ω is employed. The optical transmittance of this ITO film is about 86%.

In this embodiment, the film thickness of the first electrodes 5 is 70 nm ±5 nm, and the thickness of the second electrodes 6, the row side wiring patterns 26 and the column side wiring patterns 27 is 110 nm ±5 nm.

In other words, the first electrodes 5 are thinner in thickness and higher in optical transmittance than the second electrodes 6.

Next, the reflection-type polarizing film 14 will be described. While a typical polarizing film has a light-transmitting axis and a light-absorbing axis, a reflection-type polarizing film has a light-transmitting axis and a light-reflecting axis.

By doing black printing or bonding a black film to the outside of the reflection-type polarizing film 14 as the light absorbing layer 15, a black display can be obtained when the linearly polarized light comes in a direction of the transmission axis, and a white display can be obtained when the linearly polarized light comes in a direction of the reflection axis, and more than that, a bright white display can be obtained by virtue of the high reflection efficiency.

Moreover, since the surface of the reflection-type polarizing film 14 is a mirror surface, it is bright in a direction of regular reflection of incident light, but it becomes dark at other angles, thus the viewing angle characteristic thereof is poor. To improve the viewing angle characteristic, the diffusing layer 13 is provided on the surface of the reflection-type polarizing film 14.

In this embodiment, an integral reflection-type polarizing film, in which a diffusing adhesive layer with minute particles dispersed in an adhesive is provided as the diffusing layer 13 and black printing is given on the rear face as the light absorbing layer 15, for example, the trade name of R-DF-B manufactured by Sumitomo 3M Co. Ltd., is employed. The reflection-type polarizing film 14 is bonded on the lower surface of the first substrate 1 of the liquid crystal cell 10 by the diffusing layer 13 consisting of the diffusing adhesive layer.

The reflection-type polarizing film 14 consists of multi-layered thin films different in refractive index. In addition to this, a polarizing film consisting of a cholesteric liquid crystal polymer sandwiched between λ/4 films or utilizing a hologram is usable as the reflection-type polarizing film 14.

Figure 3:
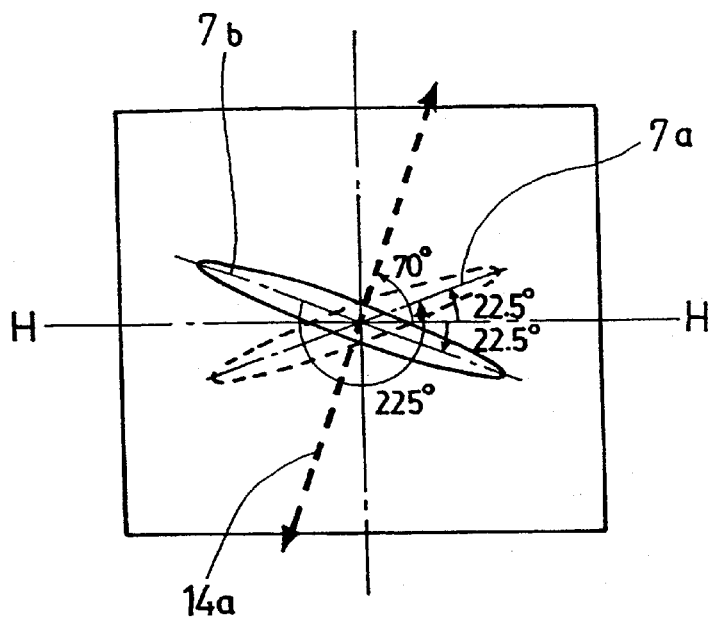
FIG. 3 is a view showing the positional relation between the alignment direction of the nematic liquid crystal and the transmission axis of the reflection-type polarizing film shown in FIG. 2.

Here, the positional relation between the molecular alignment direction of liquid crystal of the liquid crystal layer 7 and the transmission axis of the reflection-type polarizing film 14 in this embodiment is shown in FIG. 3. The positional relation between the transmission axis of the polarizing film 12 and the stretching axis of the retardation film 11 is shown in FIG. 4.

In FIG. 3, the numeral 7a represents the molecular alignment direction of liquid crystal of the liquid crystal layer 7 on the surface of the first substrate 1, which twists counterclockwise at a 22.5° angle with respect to the horizontal axis H—H. The numeral 7b represents the molecular alignment direction of liquid crystal on the surface of the second substrate 2, which twists clockwise at a 22.5° angle with respect to the horizontal axis H—H. Accordingly, the twist angle of the nematic liquid crystal in the liquid crystal layer 7 is 225°. The numeral 14a represents the direction of the transmission axis of the reflection-type polarizing film 14, which twists counterclockwise at a 70° angle with respect to the horizontal axis H—H.

Figure 4:
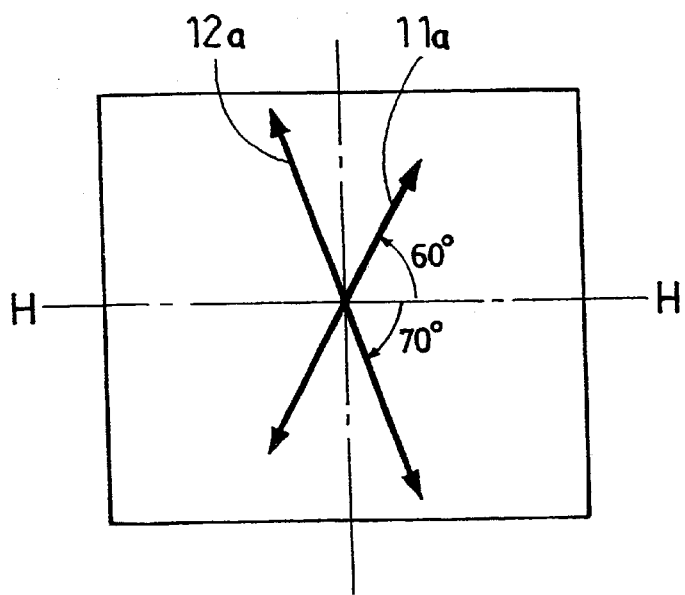
FIG. 4 is a view similar to FIG. 3 showing the positional relation between the transmission axis of the polarizing film and the stretching axis of the retardation film.

In FIG. 4, the numeral 12a represents the direction of the transmission axis of the polarizing film 12, which twists clockwise at a 70° angle with respect to the horizontal axis H—H. The numeral 11a represents the direction of the stretching axis of the retardation film 11, which twists counterclockwise at a 60° angle with respect to the horizontal axis H—H.

The retardation film 11 is a film made of stretched polycarbonate and having a thickness of about 70 μm and is the so-called Z-type retardation film having the relations of nx>nz>ny, where nx is the refractive index in the stretching direction, ny is the refractive index in the direction orthogonal thereto, and nz is the refractive index in the thickness direction. The retardation film 11 is integrated with the polarizing film 12 through an acryl-based adhesive 16.

The Z-type retardation film 11 has little variation in retardation even if seen from a tilting viewing angle, consequently, the viewing angle characteristic of the liquid crystal display device can be improved.

The color filter 3 is preferably as high in maximum transmittance as possible to improve brightness, thus the color filter 3 is made thin in thickness or the concentration of pigments is reduced. However, if the thickness is made too thin or the concentration of pigments is reduced too much, the minimum transmittance is 50% or more, that is, the chroma of the color filter 3 is extremely lowered.

Prototypes with color filters having various thicknesses have been tested, and it is consequently found that the maximum transmittance of each color filter is preferably 80% or more and most preferably 90% or more. On the other hand, the minimum transmittance of each color filter is preferably between 30% and 50% and most preferably 40%, giving priority to chroma and brightness.

Figure 5:
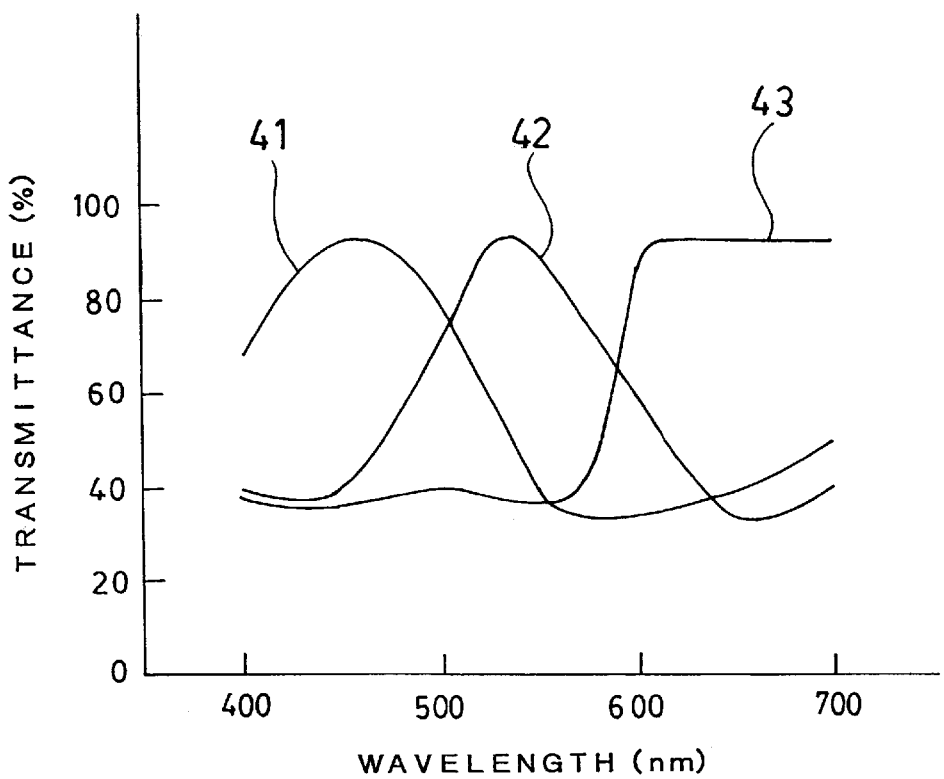
FIG. 5 is a diagram showing characteristics of a color filter used in the embodiment of the present invention.

In FIG. 5, the transmittance characteristics of the color filter used in this embodiment are shown. Curved lines 41, 42 and 43 show the transmittances of the blue (B), green (G) and red (R) color filters respectively.

Incidentally, the substrate on which the color filter 3 is formed needs a process longer than that of the substrate on which the color filter 3 is not formed. Therefore, it is easy and secure to form the color filter 3 on the thick second substrate 2 with sufficient strength. For this reason, the color filter 3 is formed on the second substrate 2 in this embodiment.

However, that is not an essential condition, but it is possible that the color filter is formed on the first substrate 1 side or color filters are formed on both the substrates 1 and 2 in some cases.

Moreover, though the color filter consisting of three colors of red (R), green (G) and blue (B) is formed in this embodiment, a color filter consisting of three colors of magenta (M), cyan (C) and yellow (Y), or a color filter consisting of two color filters or four or more color filters can be also employed in accordance with uses.

Furthermore, since materials and size of each portion in the aforesaid embodiment are one example, the present invention is not limited to the above embodiment, and as a matter of course, various changes may be made within meeting the requirements of the present invention.

For instance, the twist angle of the nematic liquid crystal constituting the liquid crystal layer 7 is not only limited to 225° but also it may be within 180° to 270°.

As is clear from the above description, according to the present invention, a reflection-type color liquid crystal display device capable of performing a color image display which is bright and excellent in chroma can be securely provided.

In other words, the reflecting surface of incident light and the liquid crystal layer are arranged closer by making the first substrate 1 adjacent to the reflection-type polarizing film of the liquid crystal cell thin, thereby obtaining a color image display bright and high in chroma with little smear due to mixture with adjacent pixels.

Moreover, the driving ICs for driving the liquid crystal cell are all mounted on the thick and strong second substrate 2 on the visible side. Furthermore, each electrode on the first substrate side and each wiring pattern connecting to the driving IC on the second substrate side are individually and electrically connected by using an anisotropic conductive sealant as an adhesive and a sealant for bonding the first and second substrates together and sealing the liquid crystal layer. Therefore, a color liquid crystal display device of high quality can be securely manufactured with limited damage during manufacturing.

What is claimed is:

1. A reflection-type color liquid crystal display device comprising a pair of substrates with liquid crystal sandwiched therebetween and electrodes provided on respective substrates, wherein a reflection-type polarizing film is provided outside one of said substrates, a color filter is provided on other of said substrates, said one substrate is thinner in thickness than said other substrate, a liquid crystal driving integrated circuit is mounted on said other substrate only, and the electrodes on said one substrate is electrically connected to said liquid crystal driving integrated circuit on said other substrate through an anisotropic conductive sealant.

2. A reflection-type color liquid crystal display device according to claim 1, wherein pixels are provided in the liquid crystal display device, and said one substrate is thinner in thickness than said other substrate so that light incident from said other substrate and reflected light thereof pass through said color filter at a portion having same color.

3. A reflection-type color liquid crystal display device according to claim 1, wherein said liquid crystal is nematic liquid crystal which is aligned at a twist angle ranged from 180° to 270°.

4. A reflection-type color liquid crystal display device according to claim 1, wherein a retardation film and a polarizing film are respectively provided outside said other substrate.

5. A reflection-type color liquid crystal display device according to claim 1, wherein a diffusing layer and a light absorbing layer are respectively provided outside said one substrate.

6. A reflection-type color liquid crystal display device according to claim 1, wherein the electrodes on said one substrate are thinner in thickness than the electrodes on said other substrate.

7. A reflection-type color liquid crystal display device according to claim 1, wherein the electrodes on said one substrate are higher in optical transmittance than the electrodes on said other substrate.

8. A reflection-type color liquid crystal display device according to claim 1, wherein said reflection-type polarizing film has a light-transmitting axis and a light-reflecting axis.

9. A reflection-type color liquid crystal display device according to claim 1, wherein said relection-type polarizing film consists of multi-layered thin films different in refractive index.

10. A reflection-type color liquid crystal display device according to claim 1, wherein said reflection-type polarizing film is one consisting of a cholesteric liquid crystal polymer sandwiched between $\lambda/4$ films, or a hologram.

* * * * *